United States Patent [19]

Kondo

[11] Patent Number: 4,586,088
[45] Date of Patent: Apr. 29, 1986

[54] TRANSMISSION CONTROL SYSTEM FOR FACSIMILE TRANSCEIVER

[75] Inventor: Mitsuru Kondo, Sagamihara, Japan

[73] Assignee: Ricoh Company, Ltd., Tokyo, Japan

[21] Appl. No.: 605,081

[22] Filed: Apr. 30, 1984

[30] Foreign Application Priority Data

Apr. 28, 1983 [JP] Japan .................................. 58-75154

[51] Int. Cl.$^4$ ............................................. H04N 1/32
[52] U.S. Cl. ..................................... 358/257; 358/260
[58] Field of Search ................ 358/257, 260, 261, 288

[56] References Cited

U.S. PATENT DOCUMENTS 3,622,695  11/1971  Rugaber ............................. 358/260
4,131,915  12/1978  Nakagome et al. ................. 358/260
4,386,373   5/1983  Kondo et al. ....................... 358/260

Primary Examiner—Joseph A. Orsino, Jr.
Attorney, Agent, or Firm—David G. Alexander

[57] ABSTRACT

A transmission control system for a facsimile transceiver allows two facsimile transceivers having different buffer memory sizes and decoding rates different from encoding rates to intercommunicate within a short period of time. Start and stop of encoding and insertion of fill bits are controlled on the basis of an amount of data stored in a buffer memory of a transmitting transceiver, which temporarily stores encoded data, and various conditions associated with a receiving transceiver, so that the number of bits encoded data per line is averaged over a plurality of lines. This decreases the transmission time and, thereby, increases the transmission rate without resorting to an increase in the processing rate of a reader or that of a recorder or an increase in modem rate.

4 Claims, 3 Drawing Figures

TRANSMISSION CONTROL SYSTEM FOR FACSIMILE TRANSCEIVER

BACKGROUND OF THE INVENTION

The present invention relates to a transmission control system for a facsimile transceiver which allows even facsimile transceivers furnished with different buffer memory sizes and/or decoding rates different from encoding rates to hold communications within a short transmission time.

In facsimile communications, the higher the data transmission rate, the shorter the transmission time is. However, since the response rate is limited by a minimum scanning time designed for a receiver, i.e., a recording speed of a printer or like recording device, the transmission rate has a certain upper limit even if the modified Huffman (MH) system or similar encoding system is employed to transmit band-compressed data. It is therefore necessary to observe the minimum transmission time assigned to a transceiver at a receiving station and such has heretofore been implemented by the insertion of fill bits, for example.

Usually, a transmitter of a facsimile transceiver is made up of a reader such as a scanner, an encoder, a buffer memory, a modem operable as a modulator, and a system control unit, while a receiver is made up of a modem operable as a demodulator, a buffer memory, a decoder, a recorder such as a printer, and a system control. Assume that the buffer memory of the transmitter, or transmit buffer memory, has a memory size Mt, the encoder has an encoding rate Ve, the buffer memory of the receiver, or receiver buffer memory, has a memory size Mr, the decoder has a decoding rate Vd, and the modems commonly have a modem rate Vm.

Assume that two facsimile transceivers each having the above construction exchange picture data. In the transmitting transceiver, the reader develops binary black-white data representative of a picture to be transmitted (hereinafter sometimes referred to as raw data). The encoder, which may comprise a microprocessor, processes the binary data output from the reader with the MH principle. The MH data are delivered from the encoder to the buffer memory. The encoded data once stored in the buffer memory are continuously transferred to the modulator synchronized with modem clock, which is output from the modulator. The procedure described so far is controlled by the system control unit.

The other or receiving transceiver demodulates the incoming encoded data by means of the demodulator. The demodulated data are continuously applied to the buffer memory in synchronism with modem clock, which is output from the demodulator. The data stored in the buffer memory are decoded by the decoder into the original binary data which are then reproduced by the recorder.

The picture signal processing times of such facsimile transceivers are related with each other as will be discussed mathematically hereinafter.

The transmitting transceiver station controls the generation interval of raw data (picture information) per line to within a predetermined range so that the generation rate of raw data at the reader may not exceed a plotter rate of the recorder at the receiving transceiver. This is, the control occurs such that the I/O rate Tp (ms/l) of the receiver of the receiving transceiver and the generation rate of raw data per line at the transmitting transceiver are in a relation $$Ts \geq Tp \tag{1}$$

The control represented by the relation (1) is always performed between facsimile transceivers of the same type and is especially required for transceivers of different types. Also, where raw data are input from an external memory or the like, the rate of receiving the data supplied from the outside has to be controlled as represented by the relation (1).

As previously described, a facsimile transceiver of the described type has a minimum transmission time Tmin per line (s/l) which is predetermined to match with a kind of the transceiver of a receiving facsimile transceiver; a control is performed such that the transmission time remains longer than the minimum transmission time by, for example, inserting fill bits. To improve the transmission rate, it is necessary to increase the processing rate of the reader and that of the recorder as well as the modem rate. This naturally results in a higher production cost. For given processing rates of a reader and recorder and a given modem rate, the transmission time cannot be shortened and, therefore, the transmission rate cannot be increased unless the number of fill bits to be inserted is made as small as possible.

A higher transmission rate may be implemented by a prior art transmission control system in which a transceiver at a transmitting station is furnished with a reader capable of reading a bunch of "N" lines at a time, and a multi-line memory for temporarily storing data read by the reader, i.e., raw data before compression, while a transceiver at a receiving station is furnished with a recorder capable of recording "N" lines at a time, and a multi-line memory for temporarily storing reproduced data. In this system, a minimum transmission time $Tmin \times N$ is predetermined for each "N" lines and, only when the transmission time has become shorter than the minimum transmission time, fill bits are inserted. In this manner, the system inserts fill bits on the basis of each "N" lines to maintain the minimum transmission time Tmin instead of inserting fill bits on a line-by-line basis to maintain the minimum transmission time Tmin, thereby averaging the density of read data. The result is a decrease in the number of inserted fill bits and, therefore, an increase in the transmission rate. Concerning such as a transmission control system, the larger the number of lines N, the greater the transmission time shortening effect is. However, an increase in the number of lines N is unattainable without an increase in the capacity of the line memory for storing raw data and, hence, without an increase in memory cost.

Another known implementation for a higher transmission rate is a transmission control system which constantly monitors a relationship between a quantity of encoded data temporarily stored in a buffer memory at a transmitting transceiver, i.e. memory size Mt, and a quantity of decoded data stored in a buffer memory at a receiving transceiver, i.e. memory size Mr. When the receive buffer memory is about to overflow, the system informs the transmitting transceiver of that storage condition to cause it to stop encoding operation or insert fill bits, thereby increasing the transmission rate. In detail, the system control is such that when the quantity of encoded data in the buffer memory at the receiving transceiver has exceeded a first value $M_1$ ($M_1 < Mr$), the encoding operation is interrupted and, when the quantity of data has decreased beyond a second value $M_2$ ($M_2 < M_1$), the encoding operation is resumed and, when the data quantity has decreased beyond a third value $M_3$ ($0 < M_3 < M_2$), fill bits are inserted.

In the second prior art transmission control system, a response from the receiving transceiver has to be sent before the receive buffer memory overflows, in order to prevent the overflow. Again, this increases the costs becaust exchange of such responses between remote transceivers is unachievable without employing a signal generator or a receiver or installing an additional channel for the transmission of the responses.

As discussed above, the first-mentioned prior art transmission control system, which increases the transmission rate when the processing rates of a reader and recorder or the modem rate is constant, cannot achieve the purpose unless an expensive line memory having a large capacity is used. The second-mentioned prior art system requires the transmitting transceiver to send out information indicative of overflow of its buffer memory, increasing the system cost for the generation and exchange of response signals.

SUMMARY OF THE INVENTION

It is therefore an object of the present invention to provide a transmission control system for a facsimile transceiver which allows remote facsimile transceivers to intercommunicate within a short transmission time even though their buffer memory sizes, encoding rates and decoding rates may be different from each other.

It is another object of the present invention to provide a transmission control system for a facsimile transceiver which shortens a transmission time without resorting to increases in the processing rates of a reader and recorder or the modem rates of transmitting and receiving facsimile transceivers.

It is another object of the present invention to provide a generally improved transmission control system for a facsimile transceiver.

A facsimile transceiver to which the present invention is applicable comprises a transmitter which has a reader for reading picture information, an encoder for removing redundancy of the picture information, a buffer memory for temporarily storing encoded data, and a receiver having a buffer memory for temporarily storing the encoded data, a decoder for reproducing the redundancy of the encoded data, and a recorder for recording the picture information. In accordance with the present invention, the transmitter comprises a first control device for performing a control such that a relation $Tsm \geq Tpm$ holds between a reading interval per line Tsm of the reader and a picture information recording time Tpm per line of the recorder, a fill bit insertion device for inserting fill bits Nf ($Nf \geq 0$ and integer) line by line in the encoded data such that a relation $Nc + Nf \geq VM \times Tdm$ holds between the fill bits Nf inserted line by line in the encoded data, a modem rate Vm of the receiver, and a minimum decode processing time Tdm per line of the decoder, and a second control device for performing a control such that a relation $Tc \geq (Nc + Nf)/Vd$ holds between an encoding interval per line Tc, a number of bits Nc of encoded data per line, the fill bits Nf to be inserted in the encoded data line by line, and the decoding rate Vd of the decoder. The transmitter and receiver being controlled such that during a protocol procedure at least the recording time Tpm of the recorder at the receiver, the modem rate Vm, a memory size Mr of the buffer memory of the receiver, the decoding rate Vd of the decoder, and the minimum decode processing time Tdm of the decoder are notified to the transmitter, during transmission of picture information the transmitter causes the first and second control means and said fill bit insertion means to satisfy the respective conditions, upon increase of an amount Mt of encoded data stored in the buffer memory beyond a first reference value $M_1$ ($M_1 < Mr$) an encoding operation is interrupted, upon decrease of the amount Mt of encoded data beyond a second reference value $M_2$ ($M_2 < M_1$) the encoding operation is resumed, and upon decrease of the amount Mt of encoded data beyond a third reference value $M_3$ ($0 < M_3 < M_2$) a predetermined number of fill bits are inserted.

The above and other objects, features and advantages of the present invention will become apparent from the following detailed description taken with the accompanying drawings.

DESCRIPTION OF THE PREFERRED EMBODIMENT

While the transmission control system for a facsimile transceiver of the present invention is susceptible of numerous physical embodiments, depending upon the environment and requirements of use, a substantial number of the herein shown and described embodiment have been made, tested and used, and all have performed in an eminently satisfactory manner.

Figure 1:
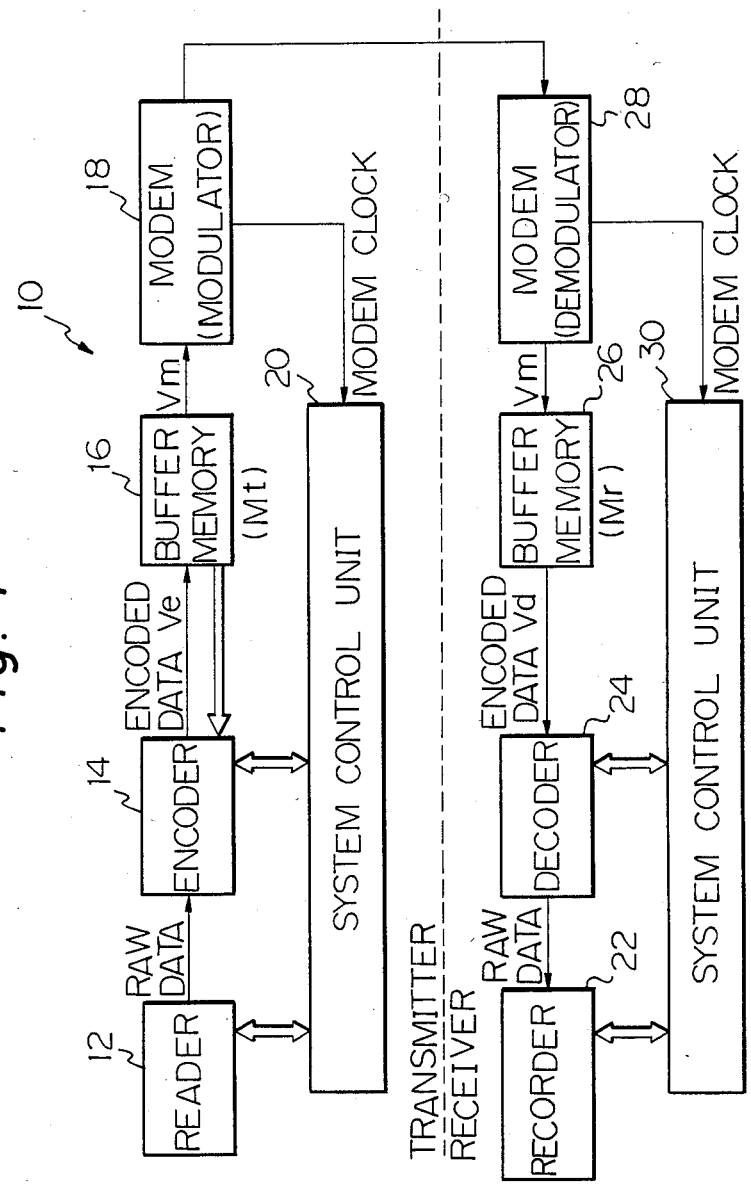
FIG. 1 is a functional block diagram showing an essential construction of a picture information processing system of a facsimile transceiver to which the present invention is applicable.

Referring to FIG. 1 of the drawings, a picture information processing system of a facsimile transceiver 10 to which the present invention is applicable is shown. The transceiver 10 includes in its transmitting section a reader 12, an encoder 14, a buffer memory 16, a modem (modulator) 18 and a system control unit 20, and in its receiving section a recorder 22, a decoder 24, a buffer memory 26, a modem (demodulator) 28 and a system control unit 30. The memory size of the buffer memory, or transmit buffer memory, 16 is indicated by Mt, the memory size of the buffer memory, or receive buffer memory, 26 by Mr, the encoding rate of the encoder 14 by Ve, and the decoding rate of the decoder 24 by Vd, while the modem rates of the modems 18 and 28 are commonly indicated by Vm. Although various encoding sytems are available for such a facsimile transceiver, the description will focus to the MH system by way of example.

At the transmitter side, the system control unit 20 controls the start and stop of operation of the reader 12 on a line-by-line basis so that the following relation may hold between a reading interval per line Tsm and a recording time for recording one line of picture information assigned to a facsimile transceiver which received at the time of facsimile protocol:

$$Tsm \geq Tpm \qquad (2)$$

The system control unit 20 controls the encoder 14 to insert fill bits after calculating fill bits Nf to be inserted in one line of encoded data (Nf≧0 and integer) from a total number Nc of bits of encoded data per line and the modem rate (communication modem rate) Vm (bits/s), such that the following relation holds between the total number of bits Nc, the modem rate Vm, a minimum encode processing time Tdm per line (ms/l) of the decoder 24, and the fill bits Nf:

$$Nc + Nf \geq Vm \times Tdm \qquad (3)$$

The control over the insertion of fill bits described above is directed to insuring a certain minimum period of time necessary for the decoder 24 to decode one line of encoded data, however short the one line of data may be. Stated another way, such a control compensates for the incapability of the decoding rate of linearly approximating itself to the number of bits of encoded data. At the same time, the encoder 14 is controlled to set up an interval Tc of starts of encoding per line data as shown below in accordance with the decoding rate Vd of the decoder 24:

$$Tc \geq (Nc + NF)/VD \qquad (4)$$

Such a control over the interval Tc of starts of line-by-line encoding is adapted to prevent the receive buffer memory 26, i.e. receive FIFO buffer memory, from overflowing. Using a ratio $\alpha$ of the decoding rate to the modem rate, the decoding rate Vd may be expressed as:

$$Vd = \alpha \times Vm \qquad (5)$$

In a practical example of the interval control, the number of bits Nc of line-by-line encoded data is counted, a required period of time from the start to the end of one line of encoding is predetermined in terms of a count Nm of modem clock (Vm), and encoding the next line is started when the count Ni of the modem clock after the start of encoding has reached a relation:

$$Ni \geq Nm/\alpha \qquad (6)$$

The control described above satisfies the condition (4). The encoder 14 does not perform encoding unless the reader 12 develops a binary picture signal.

Figure 2:
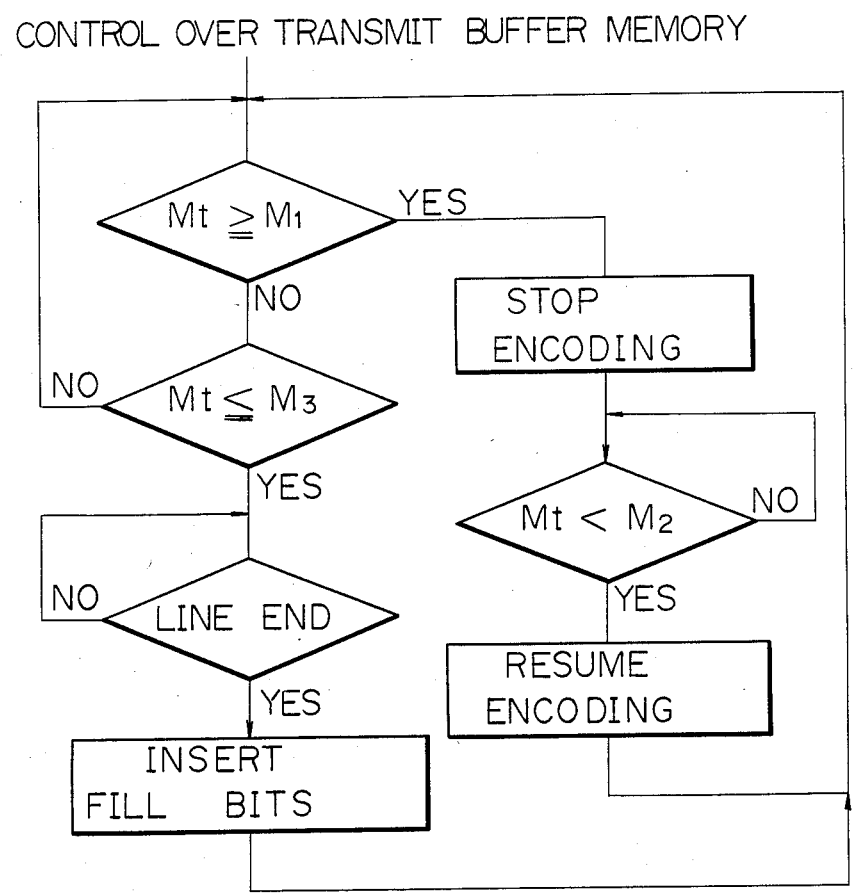
FIG. 2 is a flowchart representative of a control over a buffer memory performed by a transmitting facsimile transceiver in a transmission control system in accordance with the present invention.
Figure 3:
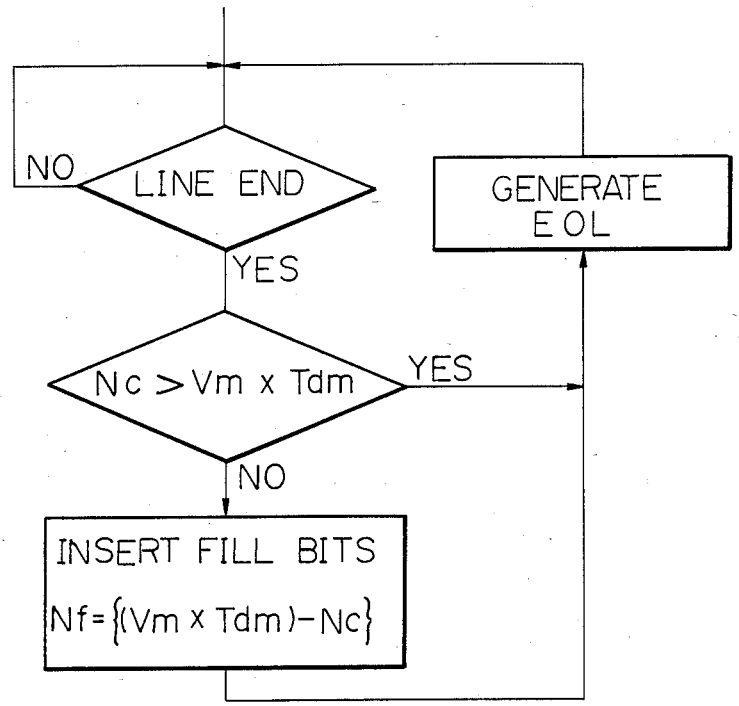
FIG. 3 is a flowchart representative of a control also performed by the transmitting transceiver for the compensation of a minimum encoding time of a decoder installed in a receiving facsimile transceiver.

FIG. 2 is a flowchart representative of a control over the transmit buffer memory 16 in accordance with the transmission control system of the present invention. FIG. 3 is a flowchart representative of a compensation control which is associated with a minimum encode processing time of the decoder 24 and also executed at the transmitting side.

In the drawings, Mt is an amount of encoded data stored in the transmit buffer memory 16 and the unit of which is a number of bits, Nc is a number of bits of encoded data per line. Vm is a modem rate, Tdm is a minimum decode processing time per line of the decoder 24, Nf is a number of fill bits to be inserted in encoded data on a line-by-line basis, and $M_1$-$M_3$ are reference data amounts associated with the transmit buffer memory 16 and preselected to be in a relation $0 \leq M_3 < M_2 < M_1 \leq Mr$. Further, EOL indicates an end-of-line code.

In the transmission control system of the present invention, the encoder 14 performs MH encoding while controlling the transmit buffer memory 16 according to the flowchart of FIG. 2. That is, the control over the transmit buffer memory 16 is such that the number of bits Mt of encoded data stored in the buffer memory 16 is prevented from increasing beyond the first reference value $M_1$ or decreasing beyond the third reference value $M_3$. When the number Mt has decreased beyond the third reference value $M_3$, a required number of fill bits are inserted to maintain the former larger than the latter. In the MH system, a fill bit is a logical "0". The encoding operation is stopped when the number Mt exceeded the first reference value $M_1$ and resumed when it has become smaller than the second value $M_2$.

In relation with such a case, assume that the memory size Mt of the transmit buffer memory 16, i.e. FIFO buffer memory, and the memory size Mr of the receive buffer memory are in a relation:

$$Mt \geq Mr \qquad (7)$$

Then, selecting the first reference value $M_1$ $$M_1 = Mr - \beta \qquad (8)$$

the encoding operation is stopped as soon as the amount of data Mt stored in the transmit buffer memory 16 exceeds $M_1$.

Where the comparison between the data amount Mt and the first reference value $M_1$ is to be performed with respect to a black/white color transition point, it is performed at $$M'_1 = M_1 - \text{(bit length of maximum code of same color)} \qquad (9)$$

On the other hand, where the comparison is performed on a line-by-line basis, the stop control over the encoding operation is performed with $$M'_1 = M_1 - \text{(bit length of largest code per line)} \qquad (10)$$

While the encoding operation is resumed upon coincidence of the data amount Mt with the second reference value $M_2$ ($M_2 < M_1$), the following relation may be selected in order to avoid frequent starts and stops of the encoding operation:

$$M_2 = M_1 - (256 \text{ to } 1024 \text{ bits}) \qquad (11)$$

Further, fill bits are inserted when the data amount Mt has decreased beyond the third reference value $M_3$ ($M_3 << M_2$), according to the flow of FIG. 3 and immediately before an EOL code.

Comparison of the data amount Mt with the third value $M_3$ occurs at the end encoding of each line and immediately before the generation of an EOL code. For example, assuming $$M_3 \geq 2 \times \{(\text{handshake I/O rate}) \times (\text{communication modem rate})\} \qquad (12)$$

the number of fill bits to be inserted is produced by $$(\text{number of inserted fill bits}) \geq (\text{handshake}) \times \qquad (13)$$

-continued
(communication modem rate)

Meanwhile, where the memory sizes of the transmit and receive buffers are related as $$M_t < M_r \quad (14)$$

the equation (8) is replaced with $$M_1 = M_t - \beta \quad (15)$$

for thereby controlling the data amount Mt in the buffer memory 16. The other controls are common to those previously described.

Hereinafter will be described the value $\beta$ included in the equations (8) and (15).

Let it be assumed that the various parameters have the following values:
Vm = 9600 bps
Tp + Ts = 10 ms/l
$\alpha = \frac{1}{2}$
Tdm = 5 ms A possible case which renders the data amount in the receive buffer memory 26 substantial is one in which a line with the most complicated pattern and a subsequent line with the simplest pattern continuously appear as long as structurally permitted. Typical of such a situation may be one in which checkers (2048 bits per line) are encoded by the MH system and followed by 64 successive lines (generated number of bits being smaller than 9600 bps × 5 ms/l) each being in a line smaller than 24 bits.

Where the encoding operation and the modem transfer begin at the same time, the number of generated bits will coincide with the number of transmitted bits when $$\text{total number of generated bits} = 9236 + (24 \times 64)$$
$$= 10772$$

For the generation of such a number of bits, there is required a period of time produced by $$\text{time} = 9236/9600 \text{ bps} \times \tfrac{1}{2} + 10 \text{ ms} \times 64$$
$$= 1121 \text{ ms}$$

In the case concerned, assuming that a decoding operation is started when a quantity of data of 10772 bits has been reached in the receive buffer memory 26, the content does not exceed 10772 even though the pattern of the 65 lines may be repeated. Therefore, the value of $\beta$ in the equation (8) or (15) which suffices the purpose in practice is:

$\beta = 10772$ bits

In the manner described, in accordance with the transmission control system of the present invention, a facsimile transceiver at a transmitting station performs controls in response to various conditions which are sent thereto from a facsimile transceiver at a receiving station during a protocol procedure. The encoder 14 starts and stops encoding and inserts fill bits while sensing the number of effective data bits, which are status signals output from the buffer memory 16. Meanwhile, encoded data stored in the receive buffer memory 26 are sequentially applied to the decoder 24 in response to the modem clock without having their amount controlled, the decoder 24 decoding the data at the decoding rate Vd. The fill bits inserted at the transmitting station are removed at the receiving station as has been the case with prior art systems.

While the present invention has been shown and described in relation with a facsimile transceiver, such is only illustrative and it is also applicable to the transmission of encoded data which have undergone compression. The data to be encoded at the transmitting station may even be the data stored in another data generating device or an external memory, instead of those which are output from the reader.

Concerning the receiving station, too, the present invention may be practiced in the case where data are stored in a memory instead of routed to a recorder. In such a case, the control will be effected employing the recording time Tpm per line as represented by the equation (2) or the like as a period of time for recording data in one line of the memory.

As described hereinabove, while a prior art transmission control system for a facsimile transceiver controls a minimum transmission time by inserting fill bits line by line, a system embodying the present invention makes the number of inserted fill bits as small as possible by controlling the start and stop of encoding as well as fill bit insertion based on an amount of encoded data stored in a transmit buffer memory and various parameters associated with a facsimile apparatus at a receiving station. Such a control over the encoding operation and insertion of fill bits is effective to average the number of bits of one line of encoded data over a plurality of lines, the average value being longer than a minimum transmission time for each line.

Hence, the transmission control system of the present invention reduces the number of fill bits to be inserted and, thereby, shortens the transmission time and speeds up transmission, even with a facsimile system in which the processing rate of a reader and/or that of a recorder is the same as prior art one or with a modem rate also common to prior art one.

For example, assume that the communication modem rate is 9600 bps, and that in the MH coding system the I/O rate is 10 ms/l and the minimum transmission time is 10 ms/l. Then, the prior art transmission control system consumes 19.2 seconds for sending a CCITT #1 document, while the transmission control system in accordance with the present invention reduces the transmission time to 15.6 seconds, meaning an about 20% cutdown of the transmission time. For the transmission control system of the present invention, use is made of a system configuration in which the memory size Mr of the receive buffer memory 26 is 16 kilobits, the decoding rate Vd is 9600 bps × 1.5, and the minimum processing time of the decoder is 5 ms/l.

In contrast to the first-mentioned prior art control system which uses a line memory for storing raw data, the control system of the present invention uses a buffer memory for storing encoded data and, therefore, allows the memory size to be reduced in proportion to the compression ratio provided by encoding, resulting in a proportionally lowered memory cost.

Furthermore, since the present invention eliminates the need for controlling a buffer memory at a receiving station as has been practiced by the second-mentioned prior art system, it is unnecessary for a transmitting station to send a response during transmission of picture information and this eliminates an increase in cost due to addition of devices.

Various modifications will become possible for those skilled in the art after receiving the teachings of the present disclosure without departing from the scope thereof.

What is claimed is:

1. In a transmission control system for a facsimile transceiver comprising a transmitter which has a reader for reading picture information, an encoder for removing redundancy of the picture information, a buffer memory for temporarily storing encoded data, and a receiver having a buffer memory for temporarily storing the encoded data, a decoder for reproducing the redundancy of the encoded data, and a recorder for recording the picture information, said transmitter comprising:
(a) first control means for performing a control such that a relation $Tsm \geq Tpm$ holds between a reading interval per line Tsm of the reader and a picture information recording time Tpm per line of the recorder;
(b) fill bit insertion means for inserting fill bits Nf ($Nf \geq 0$ and integer) line by line in the encoded data such that a relation $Nc + Nf \geq Vm \times Tdm$ holds between the fill bits Nf inserted line by line in the encoded data, a modem rate Vm of the receiver, and a minimum decode processing time Tdm per line of the decoder; and
(c) second control means for performing a control such that a relation $Tc \geq (Nc + Nf)/Vd$ holds between an encoding interval per line Tc, a number of bits Nc of encoded data per line, the fill bits Nf to be inserted in the encoded data line by line, and the decoding rate Vd of the decoder;

said transmitter and receiver being controlled such that during a protocol procedure at least the recording time Tpm of the recorder at the receiver, the modem rate Vm, a memory size Mr of the buffer memory of the receiver, the decoding rate Vd of the decoder, and the minimum decode processing time Tdm of the decoder are notified to the transmitter, during transmission of picture information the transmitter causes the first and second control means and said fill bit insertion means to satisfy the respective conditions, upon increase of an amount Mt of encoded data stored in the buffer memory beyond a first reference value $M_1$ ($M_1 < Mr$) a coding operation is interrupted, upon decrease of the amount Mt of encoded data beyond a second reference value $M_2$ ($M_2 < M_1$) the coding operation is resumed, and upon decrease of the amount Mt of encoded data beyond a third reference value $M_3$ ($0 < M_3 < M_2$) a predetermined number of fill bits are inserted.

2. A transmission control system as claimed in claim 1, in which $M_2 = M_1 - (256 \text{ to } 1024 \text{ bits})$.

3. A transmission control system as claimed in claim 1, in which the fill bit insertion means is constructed to insert fill bits only when Nc is greater than ($Vm \times Tdm$).

4. A transmission control system as claimed in claim 1, further comprising means for generating an end of line signal EOL at an end of each line of data after operation on the line of data by the fill bit insertion means.

* * * * *